United States Patent Office 3,578,415
Patented May 11, 1971

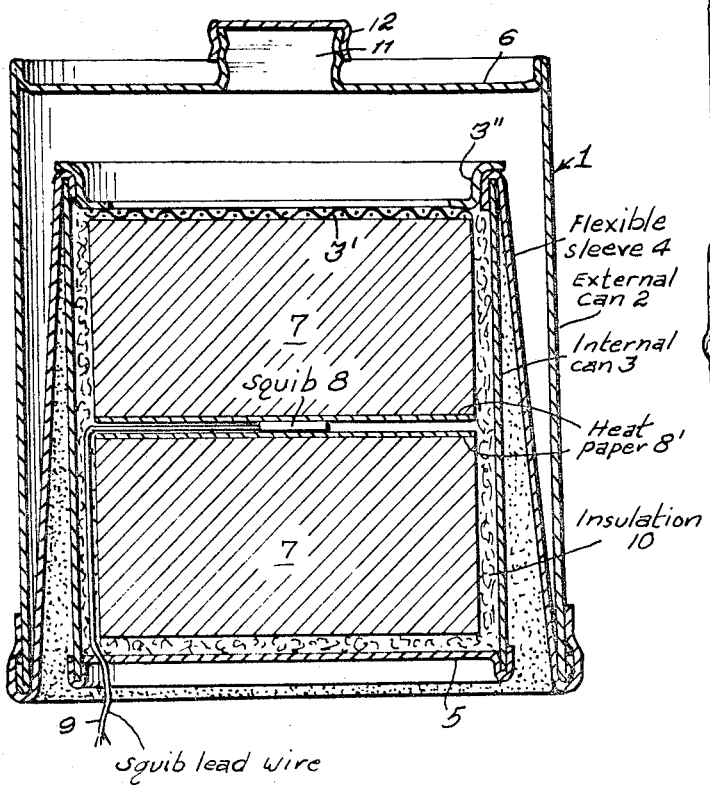
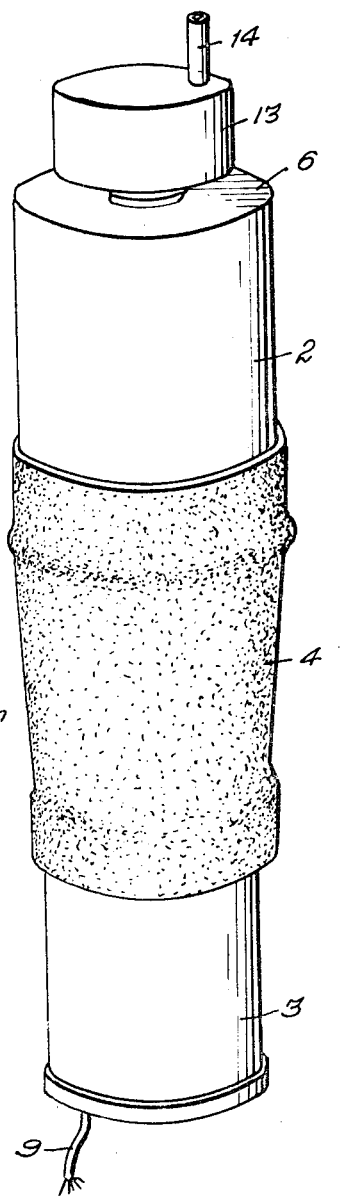

3,578,415
DRY HYDROGEN GENERATOR
Ralph H. Hiltz, Pittsburgh, Pa., assignor to the United States of America as represented by the Secretary of the Army
Continuation-in-part of application Ser. No. 681,965, Nov. 8, 1967. This application Oct. 13, 1969, Ser. No. 865,712
Int. Cl. B01j 7/00
U.S. Cl. 23—281
2 Claims

ABSTRACT OF THE DISCLOSURE

A telescopically expandable container for dry materials which produce hydrogen when heated by a squib or other means. The expandable container allows for cooling of the liberated gas and removal of moisture therefrom.

This application is a continuation-in-part of application Ser. No. 681,965, for Dry Hydrogen Generator, filed Nov. 8, 1967 and now abandoned.

BACKGROUND

Lighter-than-air gases are used to fill balloons and the like and for other purposes. The very light gas, hydrogen, is often used and is often produced on the spot by bringing together different chemicals or compounds. The use of dry materials to generate the hydrogen is advantageous but presents problems. As examples, the large amounts of heat used to initiate the reaction, and the heat liberated by the reaction must be dealt with. The basic materials liberate water vapor during the hydrogen-liberation process. For some purposes this vapor must be eliminated or reduced. This invention solves the problems.

SUMMARY

It is an object of this invention to produce a generator of hydrogen or other gases using dry or flowable materials in an expandable container.

It is a further object to produce a generator as set forth above having means to reduce the moisture content of the hydrogen or other gases.

Other objects will become apparent as the description proceeds.

DRAWING

FIG. 1 is a cross section through the invention.
FIG. 2 is a reduced elevational view illustrating the invention in its expanded condition.

PREFERRED EMBODIMENT

Expandable can 1 has telescoping outer can section 2 and inner can section 3 interconnected by a flexible sleeve 4. Bottom 5 and top 6 seal the ends of can 1. The top end of inner can section 3 is semiclosed by a perforated member or screen wire type of material 3' held in place by retainer ring 3". A charge of dry hydrogen-producing material 7 is set into action by heat-producing squib 8, ignited by lead wires 9. Heat paper 8' may be used adjacent to squib 8. Interaction of material 7 (e.g. oxalic acid and sodium borohydride), produces hydrogen gas, water vapor and additional heat. The telescoping can expands as illustrated in FIG. 2. The gas inside thus expands and does not overheat. Also, heat is lost from the enlarged expanded can surfaces to reduce overheating. If desired insulation 10 may be used as a liner for lower can section 3 where large amounts of heat are produced.

Hydrogen gas leaves through perforated member 3' and spout 11. The dry materials charge may comprise solid or semi-solid charges, or may comprise flowable materials such as dry powder or granular materials, or possibly liquids. Recharges of such flowable materials may be introduced through spout 11 or through another opening. Cap 12 may cap off spout 11 when not in use. Under some conditions cooling of the gas, due to expansion and loss of heat through the large side walls of the can, causes condensation and consequent "drying" of the hydrogen gas. When further drying is necessary the gas is passed through a dehydrator 13, either mechanical or desiccant type. The further dried hydrogen exits from 14 to be used for balloon-filling or other purposes.

Although the specific embodiment described is for producing hydrogen, the apparatus could be used to produce other gases from dry or liquid materials. For some purposes the chemical reaction could be initiated by methods or means other than the squib described.

I claim:
1. Gas generating apparatus comprising an expandable container having an inner can section with closed bottom and an outer can section with a closed top, a flexible sleeve interconnecting the can sections in telescopic fashion, a spout leading to the interior of said container, a charge of dry hydrogen-producing material in the lower section of said container, insulation means in the bottom and around the sides of said lower can section thereby protecting said lower section from heat from said hydrogen-producing material, a screen retainer attached to the top of said lower section to retain said hydrogen-producing material therein while permitting hydrogen gas to pass therethrough, a heat-producing squib implanted substantially centrally in said hydrogen-producing material, heat paper between said squib and said hydrogen-producing material such that the squib ignites the heat paper and the heat paper ignites the hydrogen-producing material, and ignition initiating means leading from said squib to ignite said squib, said heat paper, and the hydrogen-producing material therearound to thereby produce hydrogen gas and expand said container and emit gas through said spout.

2. Apparatus as in claim 1 and dehydrating apparatus connected to said spout for drying the gas passing therethrough.

References Cited

UNITED STATES PATENTS

| | | | |
|---|---|---|---|
| 653,261 | 7/1900 | Riley et al. | 23—281 |
| 3,276,846 | 10/1966 | Moni et al. | 23—281 |
| 3,458,288 | 7/1969 | Lafyatis et al. | 23—282 |

JAMES H. TAYMAN, JR., Primary Examiner

U.S. Cl. X.R.

220—85, 8; 23—212